Sept. 28, 1926.

G. A. WISE

SPECIAL PLANER

Filed Feb. 10, 1923

1,601,546

8 Sheets-Sheet 1

INVENTOR
George A. Wise
BY
William B. Wharton
HIS ATTORNEY

Sept. 28, 1926.

G. A. WISE

SPECIAL PLANER

Filed Feb. 10, 1923

1,601,546

8 Sheets-Sheet 3

INVENTOR
George A. Wise
BY
William B. Wharton
HIS ATTORNEY

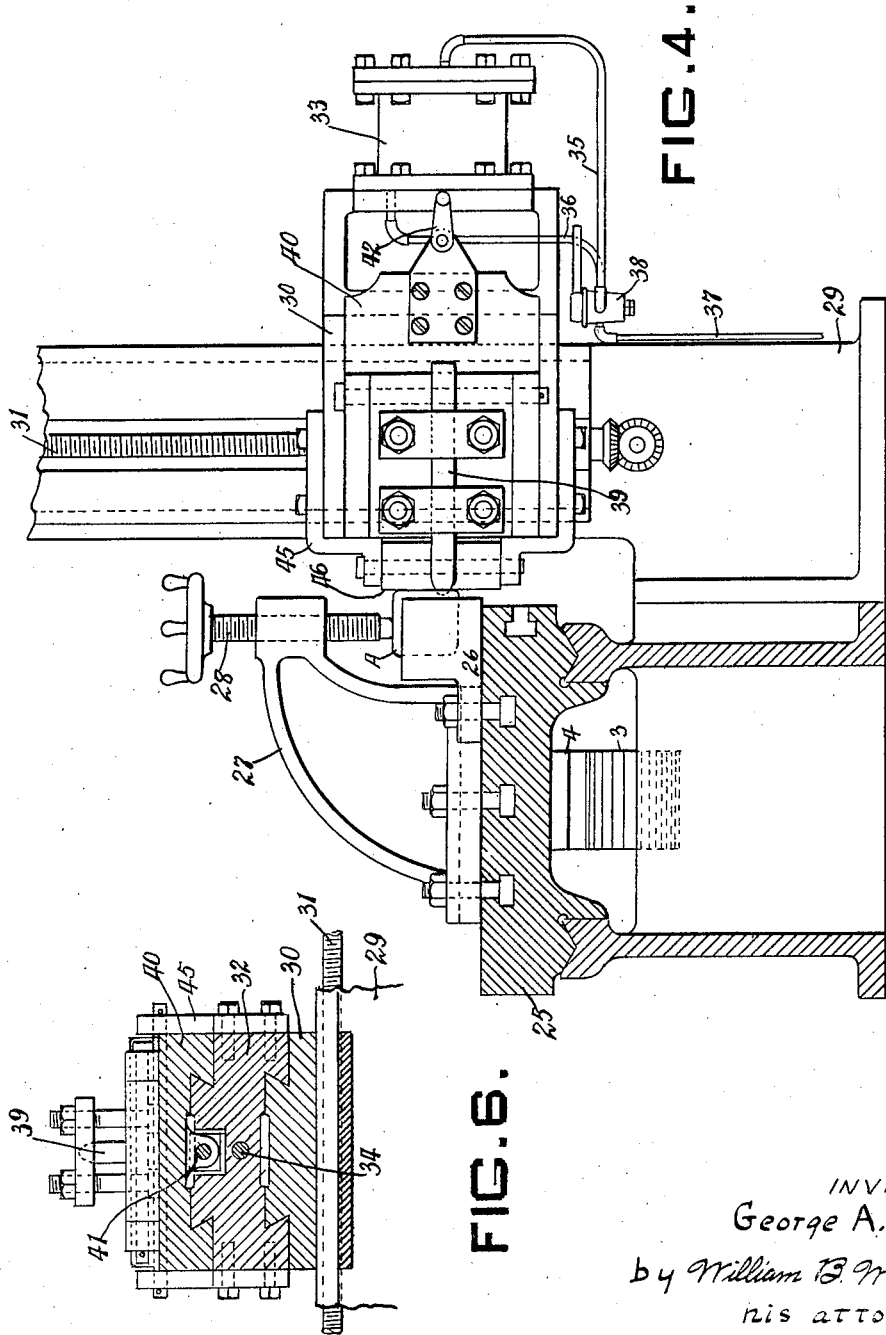

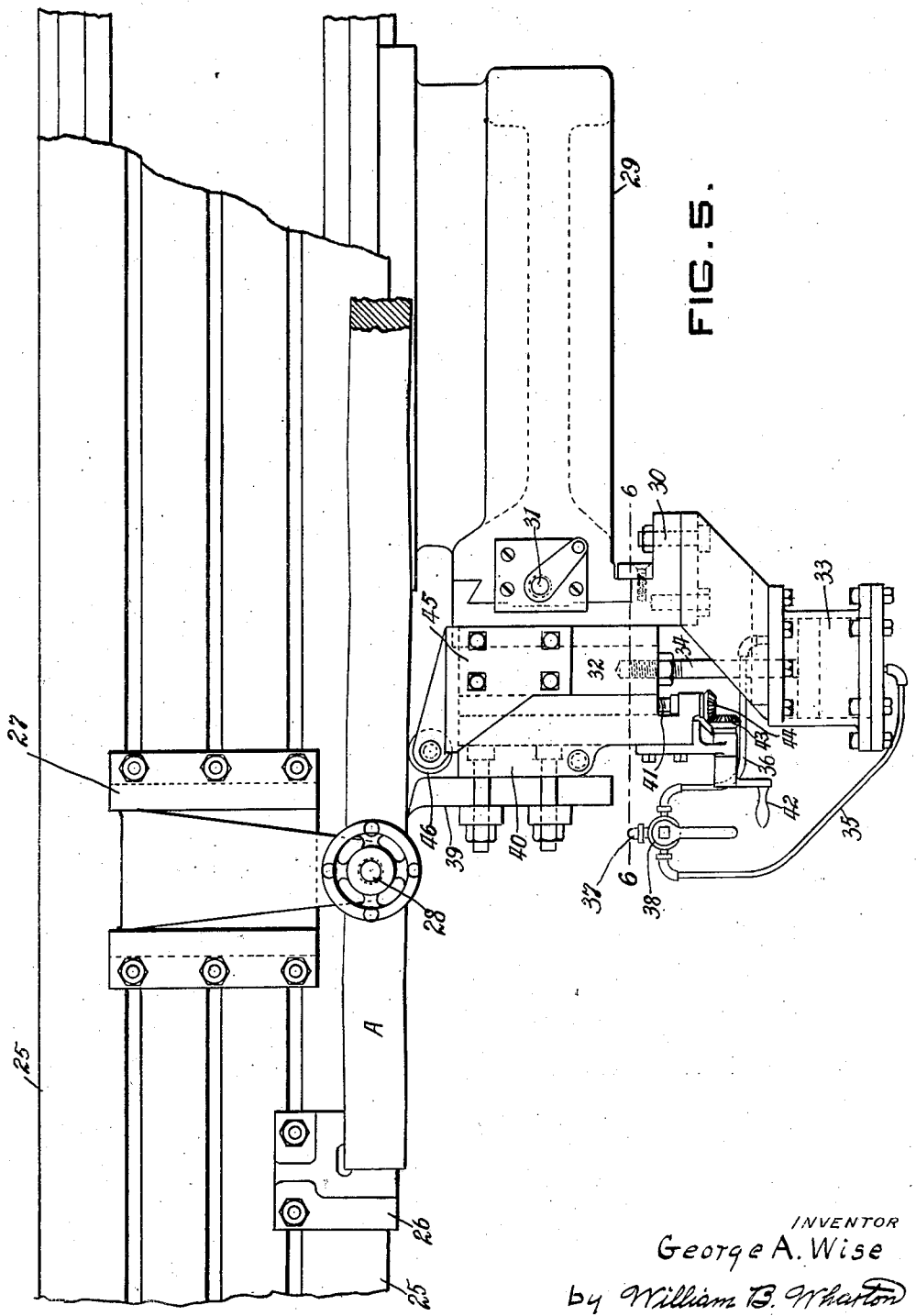

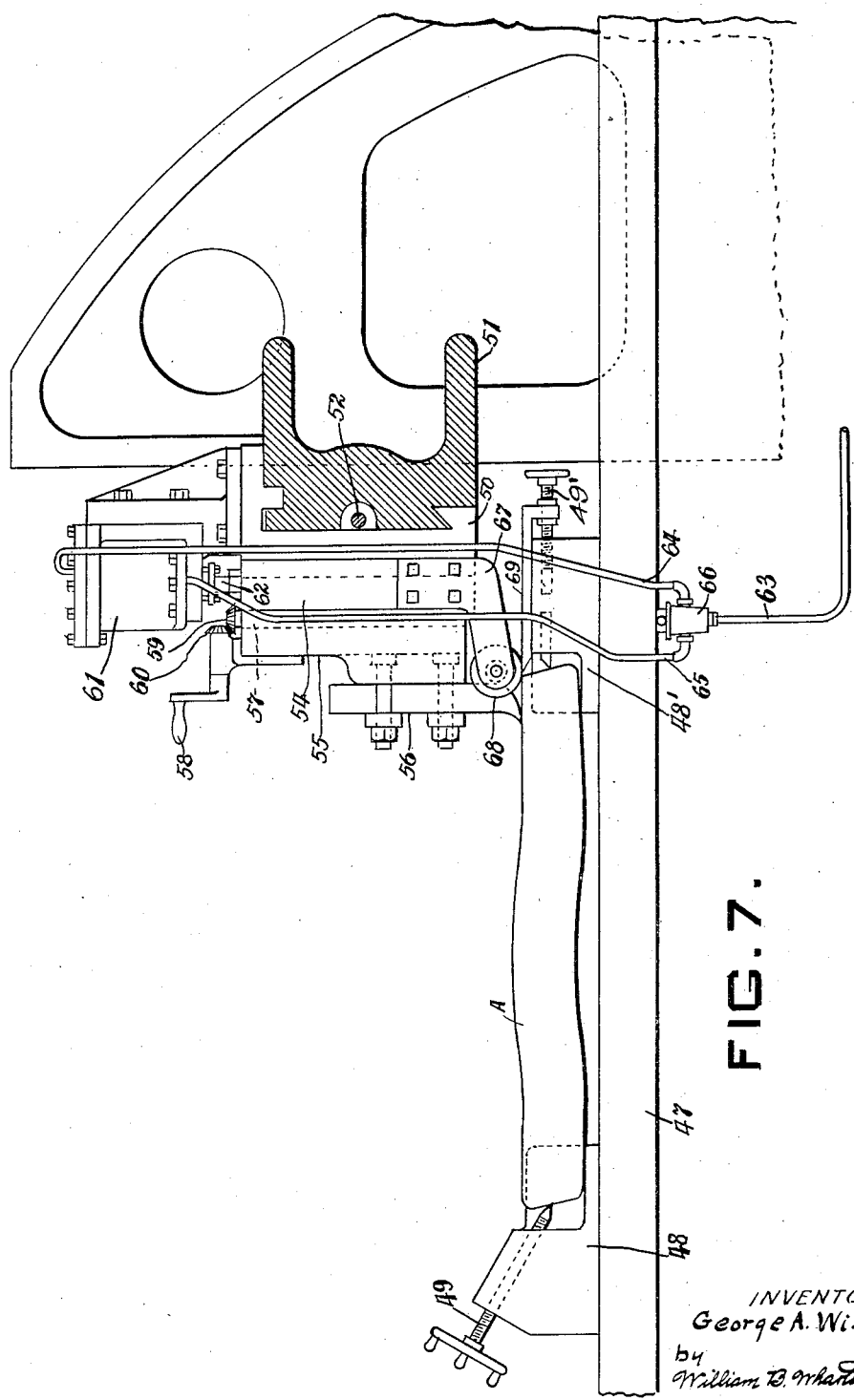

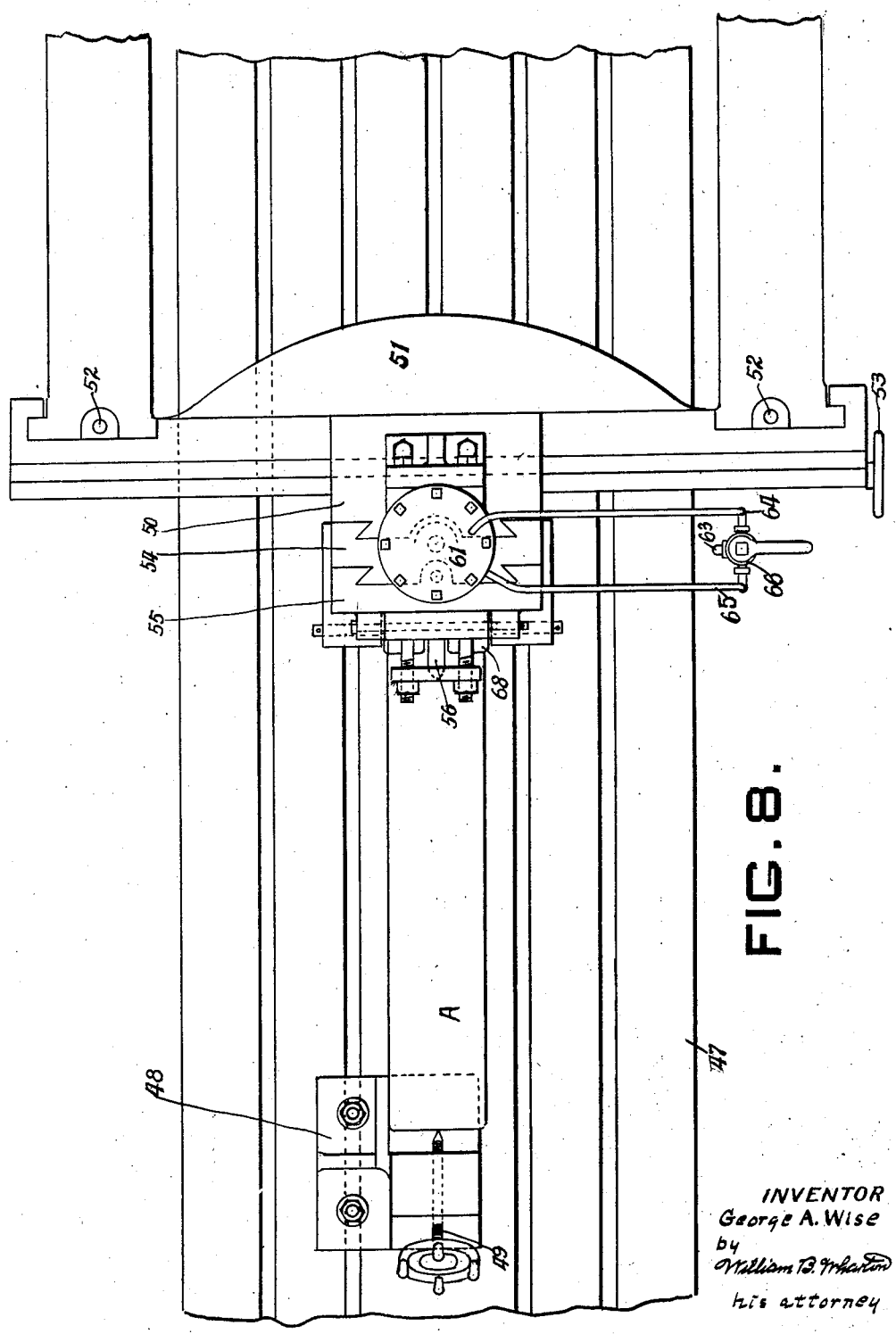

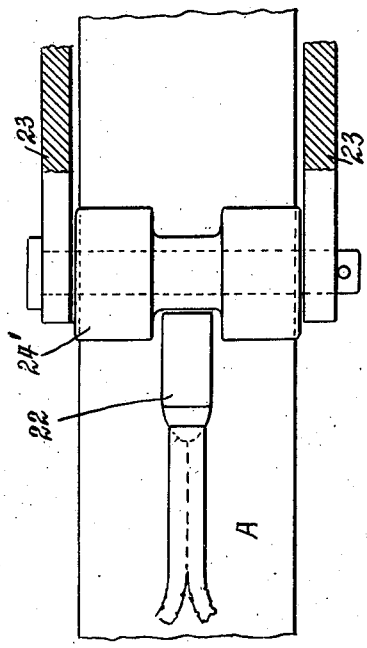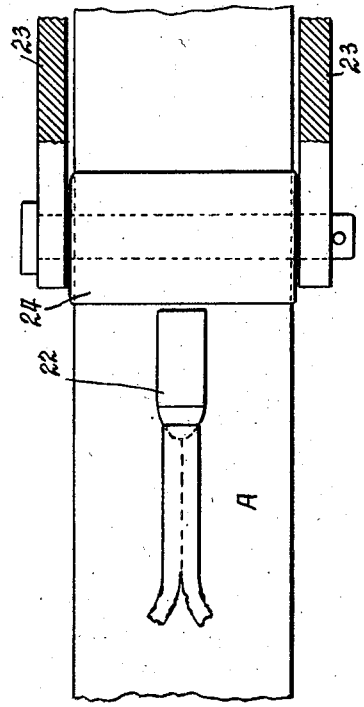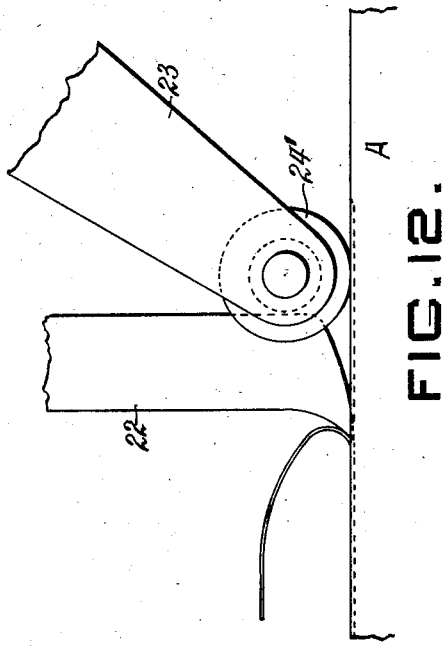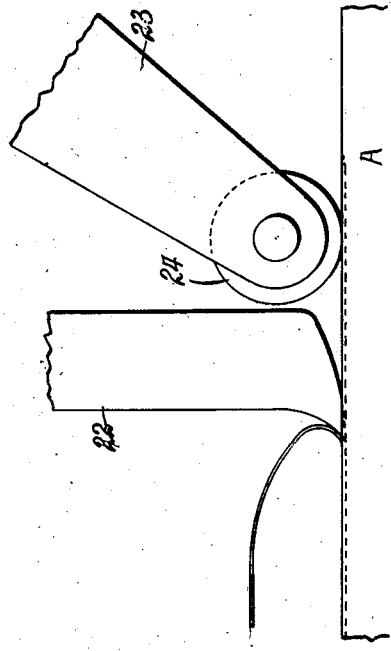

Patented Sept. 28, 1926.

1,601,546

UNITED STATES PATENT OFFICE.

GEORGE A. WISE, OF PITTSBURGH, PENNSYLVANIA, ASSIGNOR TO SUTTON-ABRAMSEN ENGINEERING COMPANY, OF PITTSBURGH, PENNSYLVANIA, A CORPORATION OF PENNSYLVANIA.

SPECIAL PLANER.

Application filed February 10, 1923. Serial No. 618,287.

This invention relates to a special planer particularly designed for eliminating seams and other surface defects from billets, slabs, blooms, ingots, castings, and the like.

In the manufacture of steel and iron products, seams and other surface defects occur in profusion and in scattered position upon the faces of billets and other partly manufactured forms in which steel and iron are made up. If such seams and other surface defects are permitted to remain in the metal, they cause points of weakness in the finished material. It is, therefore, necessary that the seams and other surface defects be removed either by a planing operation which removes from the material a slice equal in thickness to the depth of the deepest seam or other defect. or by a chipping operation which can be performed to so widen out the seam or other defect that it cannot be closed in to form a point of weakness during a subsequent working of the metal. The first of these operations may be performed by the use of a mechanical planer of standard form, while the second operation may be performed by the manual operation of a pneumatic chipping or gouging hammer.

The object of the invention is to provide a mechanical planer which elminates seams and other surface defects from metallic masses and objects with greater economy in metal than by the use of a planer of usual or standard form, and with greater economy in time and labor than by the hand operation of a pneumatic chipping or gouging hammer.

A more specific object of the invention is to provide a machine which is capable of removing a chip or sliver from the surface of a metallic mass or object at any point upon a face thereof without continuing such cut the entire length or width of the face.

A corollary object of the invention is to provide a machine which removes the metal adjacent the seam or defect in the form of an integral chip or sliver which shows in itself if the metal has been removed for the entire depth of the seam or other defect.

A further object of the invention is to provide a special planer having the above noted characteristics which is simple and sturdy in construction, and which may be efficiently employed by a relatively unskilled operator.

Figure 1:
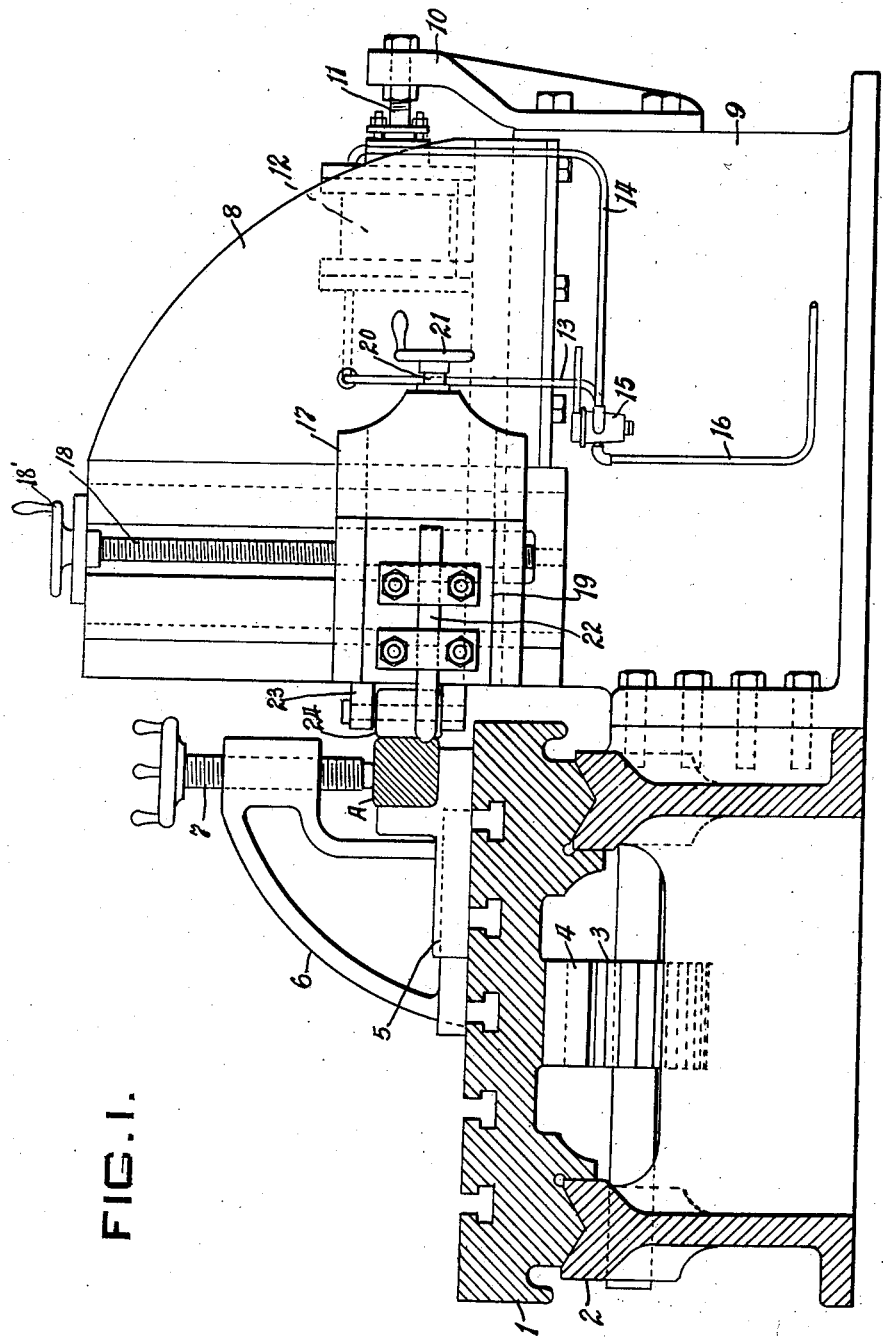
Figure 2:
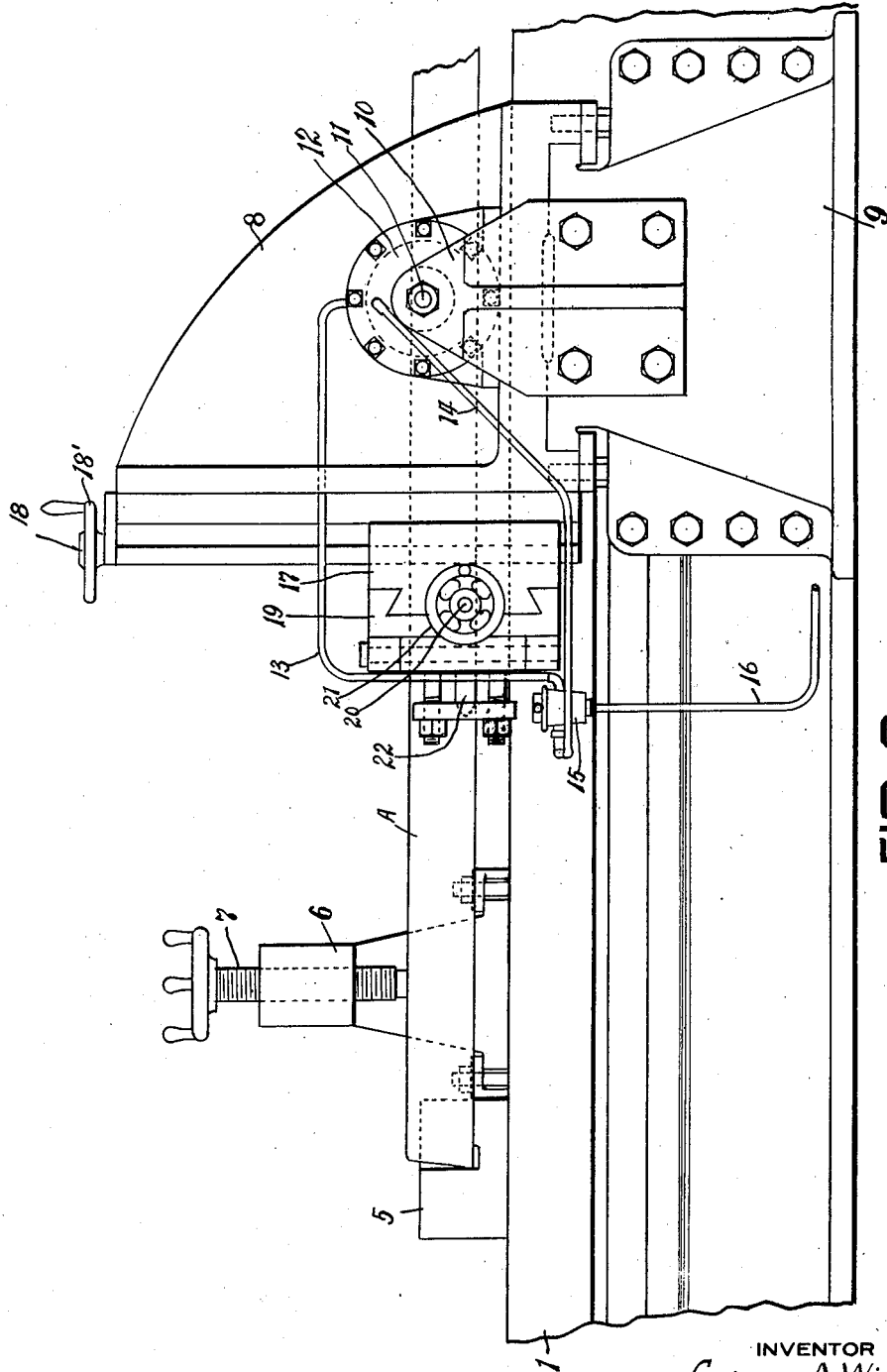
Figure 3:
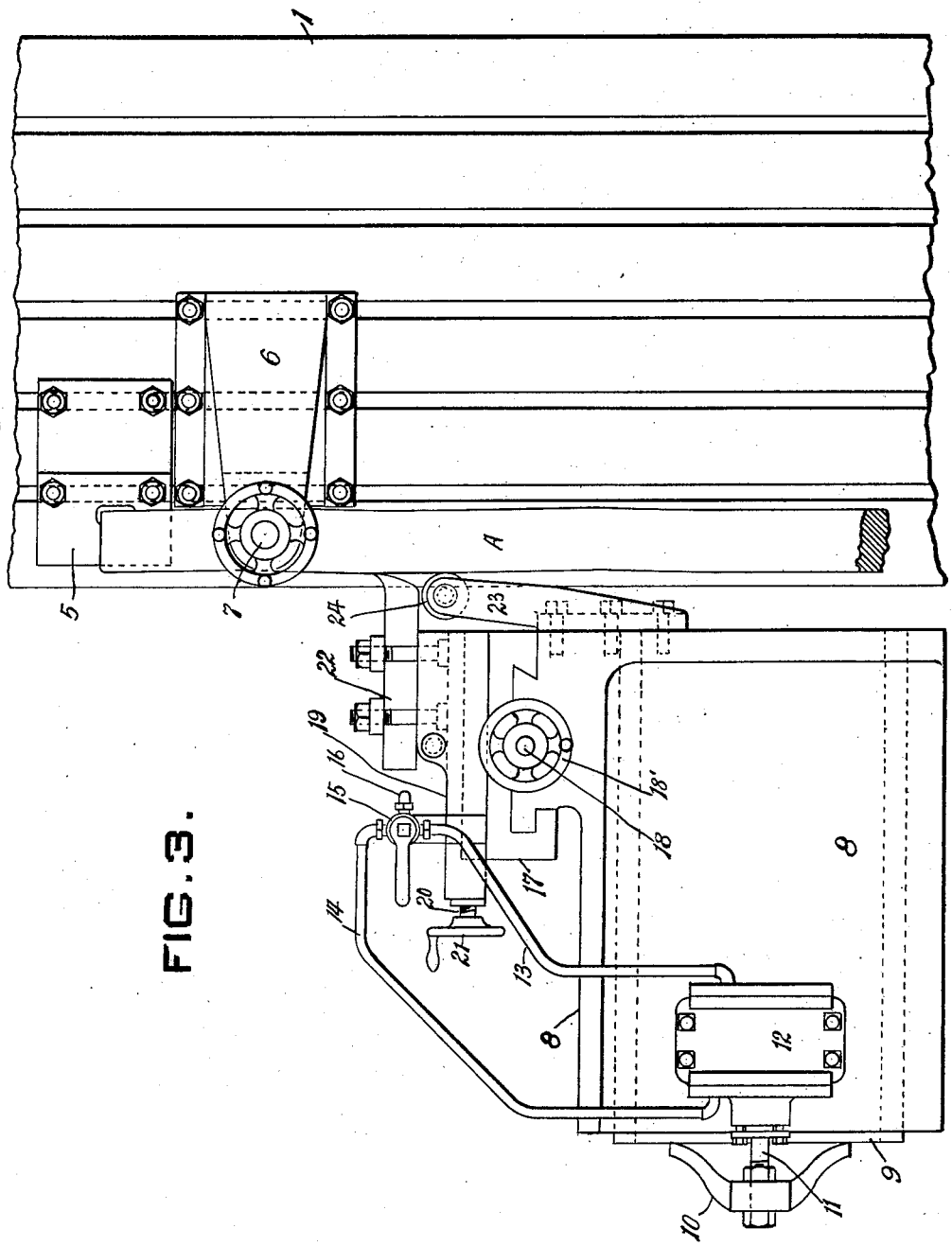

In the accompanying drawings Figure 1 is a vertical section through the planer of the present invention; Figure 2 is a front elevation of such planer; Figure 3 is a plan view thereof; Figure 4 is a vertical section through a planer or standard form, showing in elevation a special attachment comprising a planing tool and operating means therefor constructed in accordance with the present invention; Figure 5 is a plan view of such machine; Figure 6 is a cross sectional view on the line 6—6 Figure 5; Figure 7 is a vertical section illustrating the attachment of a slightly modified form of the device to the cross rail of a planer; Figure 8 is a plan view of such modification; Figure 9 is a detail plan view of the planing tool and roller associated therewith illustrating the removal of a chip from the surface of a metallic object; Figure 10 is a detail elevation of the same elements; and Figure 11 and 12 are similar views illustrating a modified form of roller.

The form of the machine shown in Figures 1, 2, and 3 of the drawings comprises a planer table or platform 1, which is slidable on tracks or ways 2, and which is moved longitudinally by means of a pinion or the like 3 meshing with a rack 4 on the under side of the table. On the table or platform 1 are rest blocks 5 for receiving the billet or other work A, and one or more brackets 6 in which engage set screws 7 for clamping the work on the table.

Disposed at right angles to the table or platform 1 is a housing 8 slidable on a supporting table or frame 9. Supported in a bracket 10 secured to frame 9 is the plunger 11 of a double acting pressure cylinder 12, which is mounted on the housing 8. Communicating with the opposite sides of cylinder 12 are conduits 13 and 14, which are in communication by three way valve 15 with a fluid pressure line 16. The entire housing 8 may thus obviously be moved toward and away from the platform 1 by operation of the valve 15.

The actual means for exerting a chipping or gouging action upon the billet or other work A are mounted on the housing 8. Such means comprise primarily a chuck 17, which is vertically adjustable by means of a vertically disposed adjusting screw 18; and a tool holder 19, which is horizontally adjustable in chuck 17 by means of an adjusting screw 20 operated by a hand wheel 21.

The chipping or gouging tool proper 22 is secured to the tool holder 19 in any suitable manner, as by means of bolts or the like. It will be observed from a consideration of Figure 3 of the drawings that the chipping or gouging tool 22 is so designed that its cutting edge is at a relatively small angle to the face of the billet or other work A on the table or platform 1.

Secured to the housing 8 is a yoke 23 in which is mounted a roller 24 arranged to contact and ride upon the face of the work A closely adjacent the chipping or gouging tool 22.

In operation of the machine the table or platform 1 is traversed, and the chipping or gouging tool 22 caused to remove from the face of the billet or other work A chips of metal immediately surrounding seams or other surface defects therein.

The gouging tool 22 is entered during movement of platform 1 by operating valve 15 to move the entire housing 8 toward the work. In this connection it should be observed that the cutting edge of the tool is set in a direction counter to the direction of travel of platform 1 and at a relatively slight angle to the face of the work itself. The cutting effect of the tool as it enters the work is therefore the resultant of the set of the cutting edge of the tool, the movement of the platform 1, and the movement of the housing 8 at right angles to that of the platform. The tool thus enters the work on a line at a relatively slight angle to the face of the work, or rather on a series of short straight lines approximating an arc of relatively slight curvature. Also, in withdrawing the tool by operation of valve 15 a similar cutting effect is obtained. This entering and withdrawal of the gouging or cutting tool is of importance because it leaves no square shoulders to form points of weakness in the metal upon a subsequent working thereof.

The depth of cut may be regulated by operation of hand wheel 21 to advance or retract the cutting tool 22. Obviously this regulation may be effected during the making of a single cut, so that if a seam vary in depth throughout its length it may be wholly removed without unnecessary loss of metal. A relatively unskilled operator may thus make a satisfactory cut by a previous observation of the more important seams to be gouged out, and by operating hand wheel 21 while observing the progress of the cutting tool.

Curvature or curvatures in the face of the work being operated upon are automatically compensated for by the roller 24; which closely follows the cutting tool 22, and which causes slight movement of the entire housing 8. The riding of roller 24 on the face of the work is effective in causing such movement because the fluid pressure cylinder 12 constitutes a yielding backing means for holding the entire housing and the cutting tool to the work. Roller 24 is also of great importance in that it serves as a positive check to prevent fluid pressure cylinder 12 from forcing the cutting tool too deeply into the work. As the fluid pressure cylinder exerts a constant force tending to advance the entire tool carrying structure, a cut of too great depth might otherwise be made because of momentary failure to watch the progress of the operation and regulate the position of the tool holder in its chuck.

As shown in detail in Figures 9 and 10 of the drawings, the roller 24 is solid and set as close as such structure permits to the gouging or cutting tool. As shown in Figures 11 and 12 of the drawings, the roller is cut away in spool form so that it is enabled to straddle, and thus follow more closely, the cutting tool 22. It will be readily understood that two relatively narrow rollers, one positioned on each side of the cutting tool, may be provided instead of either form of single roller shown.

Figures 9 to 12 inclusive of the drawings also illustrate in detail the cutting of a chip from the face of the work. As shown in the figures of the drawings, the chip is gouged or chipped whole from the metal. The complete chip may therefore be examined to insure that the cut has extended the entire depth of the seam or other defect throughout the entire length thereof.

As illustrated in Figures 4, 5, and 6 of the drawings, the invention is embodied in a modified form arranged for attachment to the housing of a planer of standard or of usual form and design. In such form the platform 25 of the planer is movable similarly to the platform 1 of the planer described above, and is similarly provided with rest blocks 26, and with brackets 27 and set screws 28.

The head which embodies the novel features of the device is supported by the housing 29 of the planer. This head comprises a chuck 30, which is vertically adjustable in the housing 29 by means of a vertical adjusting screw 31, and in which a second chuck 32 is horizontally movable.

Mounted on chuck 30 is a double acting fluid pressure cylinder 33, the plunger 34 of which bears against the horizontally movable chuck 32. Connected with the ends of fluid pressure cylinder 33 are conduits 35 and 36 which are in communication with a fluid pressure line 37 and are controlled by a three way valve 38. The cutting or gouging tool 39 of the device is secured by bolts or the like to a tool holder 40, which is horizontally adjustable in chuck 32 by means of an adjusting screw 41 operated by handle 42 through bevel pinions 43 and 44. Mounted on chuck 32 is a yoke 45, which carries a roller 46 arranged to bear against the face of the work closely adjacent the cutting or gouging tool 39. This roller and the cutting and gouging tool may be identical in form with similar elements of the previously described embodiment of the invention.

The operation of a planer provided with this specially formed head is generally similar to that of the form of planer which is specially designed throughout. There is, however, a mechanical difference in operation in that the roller 46, in compensating for irregularities in the face of the work, acts directly upon the chuck 32; which carries the tool holder 40, and which is yieldingly backed by the fluid pressure cylinder 33. The tool holder 40 may be adjusted in chuck 32 to vary the depth of the cut made by the tool.

It will be noted that the embodiment of the invention described immediately above is mounted on the planer housing, and is arranged to operate upon a side face of the billet or other work. The modification shown in Figures 7 and 8 of the drawings, while generally similar, is arranged to be mounted on the side rail of a planer and to operate upon the upper face of the billet or other work.

In this modification the planer table 47 is provided with rest blocks 48 and 48′, and with set screws 49 and 49′ arranged to bear each upon one end of the work A therein. In this modification a chuck 50 is horizontally adjustable on the side rail 51 of the planer by means of an adjusting screw 52 and hand wheel 53. A second chuck 54 is vertically movable in the chuck 50, and in turn carries the tool holder 55 which holds the cutting tool 56. The tool holder 55 is adjustable in chuck 54 by means of an adjusting screw 57, which is operated by a crank 58 through bevel gears 59 and 60.

Secured to chuck 51 is a double acting fluid pressure cylinder 61, the plunger 62 of which bears against the chuck 54. This fluid pressure cylinder is connected to a pressure line 63 by conduits 64 and 65 and valve 66. Mounted on chuck 54 is a yoke 67, which carries a roller 68 arranged to ride upon the face of the work.

With this modification is shown a guide 69, which if desired may be employed in conjunction with this or either of the other forms of the device for starting the compensating roller along the face of the work.

It will be readily understood that one or the other of the forms of special head shown respectively in Figures 4, 5, and 6, and in Figures 7 and 8, may be applied or readily adapted for application to shapers and other metal working machines which are not included strictly by the term "planer."

When the head is applied to the ram of a shaper, the tool necessarily moves over the work, the work in such case being held immovably by stationary supporting means.

All forms of the device present the advantages previously set forth together with other and further advantages which will be appreciated by those skilled in the art to which the invention pertains.

As the invention is susceptible of various further embodiments and modifications other than those illustrated and described without departing from its spirit, the scope of the invention is to be restricted only by the limitations contained in the appended claims.

What I claim is:

1. A cutting or gouging head for attachment to metal working machines having mutually movable work supporting and head supporting means, comprising an adjustable chuck, a second chuck movable in said first chuck toward and away from the work, and a cutting tool mounted in said second chuck and arranged to be independently advanced and retracted therein.

2. A cutting or gouging head for attachment to metal working machines having mutually movable work supporting and head supporting means, comprising an adjustable chuck, a second chuck movable in said first chuck toward and from the work, yielding means arranged to act upon said second chuck, and a cutting tool mounted in said chuck.

3. In a cutting or gouging head for attachment to metal working machines having mutually movable work supporting and head supporting means, a cutting tool and supporting means therefor, means for yieldingly forcing said tool to the work, means arranged to ride upon the face of the work for limiting the effect of such yielding means, and independently operable means for advancing and retracting the tool.

4. A cutting or gouging head for attachment to metal working machines having mutually movable work supporting and head supporting means, comprising an adjustable chuck, a second chuck movable toward and away from the work in said first chuck, a cutting tool mounted in said second chuck, means arranged to act upon said second chuck for entering the tool into the work and withdrawing it therefrom, and means arranged to ride upon the face of the work for limiting the extent to which the tool enters thereinto.

5. A cutting or gouging head for attachment to machine having mutually movable work supporting and head supporting means, comprising an adjustable chuck, a second chuck movable toward and away from the work in said first chuck, a cutting tool mounted in said second chuck and arranged to be independently advanced and retracted therein, means arranged to act upon said chuck for entering the tool into the work and withdrawing it therefrom, and means arranged to ride upon the face of the work for limiting the extent to which the tool enters thereinto.

In witness whereof, I hereunto set my hand.

GEORGE A. WISE.